(12) United States Patent
Joshua et al.

(10) Patent No.: US 8,756,362 B1
(45) Date of Patent: Jun. 17, 2014

(54) METHODS AND SYSTEMS FOR DETERMINING A CACHE ADDRESS

(75) Inventors: Eitan Joshua, Ramot Menashe (IL); Adi Habusha, Moshar Alonee-Abba (IL)

(73) Assignee: Marvell Israel (M.I.S.L.), Yokneam (IL)

( * ) Notice: Subject to any disclaimer, the term of this patent is extended or adjusted under 35 U.S.C. 154(b) by 519 days.

(21) Appl. No.: 13/028,660

(22) Filed: Feb. 16, 2011

Related U.S. Application Data

(60) Provisional application No. 61/305,088, filed on Feb. 16, 2010.

(51) Int. Cl.
*G06F 12/06* (2006.01)
*G06F 13/00* (2006.01)
*G06F 13/28* (2006.01)

(52) U.S. Cl.
USPC .................. 711/5; 711/154; 711/E12.069

(58) Field of Classification Search
None
See application file for complete search history.

(56) References Cited

U.S. PATENT DOCUMENTS 5,875,465 A * 2/1999 Kilpatrick et al. ............ 711/134

* cited by examiner

*Primary Examiner* — Eric S Cardwell (57) ABSTRACT

A method and system are provided for determining a next available address for writing data to a cache memory. In one implementation, a method includes receiving a request for a candidate address in the cache memory, the cache memory divided into a plurality of banks. The method further includes determining a candidate address in each of the cache memory banks using an address determination algorithm, selecting one of the candidate addresses from among the determined candidate addresses using an address selection function different from the address determination algorithm, and returning the selected candidate address in response to the request.

20 Claims, 5 Drawing Sheets

FIG. 5

METHODS AND SYSTEMS FOR DETERMINING A CACHE ADDRESS

RELATED APPLICATIONS

This application claims the benefit of priority to U.S. Provisional Application No. 61/305,088, filed on Feb. 16, 2010, titled "Semi Pseudo LRU," the contents of which are hereby incorporated by reference in their entirety.

BACKGROUND

1. Technical Field

The systems and methods disclosed herein relate to the field of cache memory management within a computer system and, more specifically, to methods and systems for determining cache addresses for use in cache memory replacement.

2. Description of the Related Art

Cache memory is used in various computer systems to increase processor performance by alleviating the need for the processor to fetch data directly from main system memory sources, such as, for example, dynamic random-access memory (DRAM). By using cache memory, a central processing unit (CPU) is capable of quickly fetching data from the main system memory sources, without incurring the wait-states associated with the main memory sources, thereby improving processor performance. For example, commonly used data is made readily available to the processor in a memory architecture that does not require paging cycles, that uses a relatively fast-access memory cell, and that places the cache in close proximity to the processor's local bus in order to reduce physical delay associated with bus structures.

In order to optimize use of the cache, especially as cache memories grow larger, strategies are needed to quickly and efficiently fetch addresses or data that is stored in the cache.

The description above is presented as a general overview of related art in this field and should not be construed as an express or implied admission that any of the information contained therein constitutes prior art against the present patent application.

SUMMARY

One aspect of described embodiments is directed to a method for determining a next available address for writing data to a cache memory. The method includes receiving a request for a candidate address in the cache memory, the cache memory being divided into a plurality of banks. The method further includes determining a candidate address in each of the cache memory banks using an address determination algorithm, selecting one of the candidate addresses from among the determined candidate addresses using an address selection function different from the address determination algorithm, and returning the selected candidate address in response to the request.

Another aspect of described embodiments is directed to a system on a chip. The system includes one or more processors, and further includes a shared memory that is shared by the one or more processors, the shared memory comprising a plurality of memory banks, each memory bank having a local control unit configured to perform an address determination algorithm on a corresponding memory bank, wherein the local control units operate in parallel to determine a set of candidate addresses in the plurality of memory banks in response to an address request from the one or more processors. The system further includes a global controller operably connected to the shared memory, the global controller being configured to select a candidate address from among the set of determined candidate addresses and return the selected address in response to the address request. The local control units each employ an address determination algorithm that is different from the address selection algorithm employed by the global controller to select an address from among the set of determined candidate addresses.

Another aspect of described embodiments is directed to a global controller for controlling a cache memory that is divided into a plurality of memory banks. The global controller executes logic to perform a method. The method includes receiving a request for a candidate address in the cache memory, the cache memory divided into a plurality of banks. The method further includes determining a candidate address in each of the cache memory banks using an address determination algorithm, selecting one of the candidate addresses from among the determined candidate addresses using an address selection function different from the address determination algorithm, and returning the selected candidate address in response to the request.

It is noted that both the foregoing general description and the following detailed description are illustrative and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings.

DETAILED DESCRIPTION

In the following description, for purposes of explanation and not limitation, specific techniques and embodiments are set forth, such as particular sequences of steps, interfaces, and configurations, in order to provide a thorough understanding of the techniques presented herein. While the techniques and embodiments will primarily be described in context with the accompanying drawings, it is noted that the techniques and embodiments can also be practiced in other electronic devices or systems.

Reference will now be made in detail to examples of the presently claimed invention, examples of which are illustrated in the accompanying drawings. Wherever possible, the same reference numbers will be used throughout the drawings to refer to the same or like parts.

Figure 1:
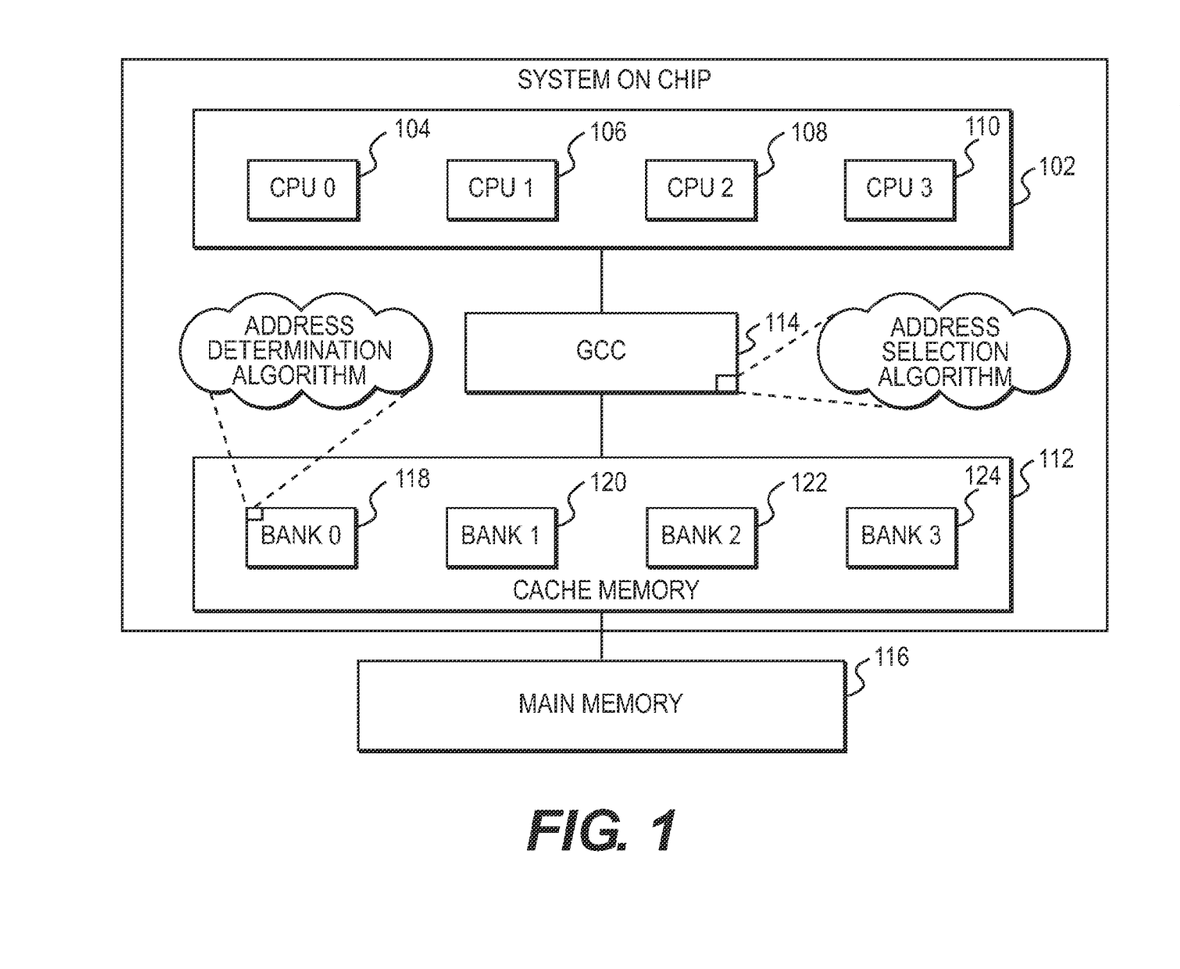
FIG. 1 is a block diagram illustrating a system for determining a next available address for writing data to a cache memory in accordance with an embodiment.

FIG. 1 is a block diagram of a system on chip 100, in accordance with an embodiment of the disclosure. The number of components in system 100 is not limited to what is shown and other variations in the number of arrangements of components are possible without deviating from the scope of the claims.

For the purpose of illustration, system 100 includes a central processing unit (CPU) 102 having a plurality of processing cores 104, 106, 108, and 110. Processing cores 104-110 utilize a shared cache memory 112, whereby access to shared cache memory 112 between the processing cores 104-110 is controlled by global cache controller 114. Cache memory 112 is connected to main memory 116, which in an embodiment is DRAM, a hard disk drive (HDD), or other suitable memory source located remotely from the system 100. Cache memory 112, in an embodiment, is located either within the processor or in close proximity to the processor, such as on the processor's local bus.

Although not shown, in an embodiment system 100 includes a combination of one or more application programs and/or hardware components. For example, an application program includes a software module, a sequence of instructions, a routine, a data structure, a display interface, and/or any other type of structure that is suitable to be executed on a processor from a computer-readable storage medium to perform operations of presently described embodiments. Further, in various embodiments hardware components include any suitable combination of CPUs, buses, memory devices, storage units, data processors, control devices, analog-to-digital converters, digital-to-analog converters, modulators, transmitters, input devices, output devices, or other such devices apparent to those skilled in the art.

In an embodiment, shared cache memory 112 is divided into a number of smaller banks Bank0 118, Bank1 120, Bank2 122, and Bank3 124, where, in an embodiment, the number of banks corresponds to the number of processing cores present in system 100. In alternate embodiments, the number of banks is greater than, or less than the number of processing cores. Moreover, in an embodiment, each processor core accesses any of banks 118-124 of cache memory 112 as directed by global cache controller (GCC) 114. Global cache controller 114 is used to control various eviction of data from cache memory 112 according to an appropriate cache algorithm used for managing the cache memory. Such a cache algorithm will control the eviction of data from cache memory 112 when data requested by processing cores 104-110 is not found in the cache. Furthermore, global cache controller 114 suitably selects a particular address for eviction, a process that will be described in more detail later. The term "cache hit" is used herein to refer to a memory access in which the required memory operand is already in cache memory 112, and the term "cache miss" is used to refer to a memory access in which the memory operand is not in the cache and must be loaded from main memory 116 or some other memory system.

The selection of an appropriate cache algorithm for managing a cache memory will often depend on the cache organization and the type of mapping function used by global cache controller 114. One of the cache organizations is the direct-mapped cache organization. In a direct-mapped cache, a portion of the main memory address is used as an index, and the remainder of the main memory address (not including any bits of the main memory address that represent bytes within a cache line) is used as a tag. For every memory access that the CPU performs, the tag of the cache line that is supposed to hold the required block is checked to see if the correct block is in the cache. Since no two blocks that map into the same line have the same tag, the cache controller can determine if there is a cache hit or a cache miss. In a direct-mapped cache, each main memory block is mapped to a specific cache line.

However, systems exhibiting strong locality of reference will repeatedly reference blocks of memory that map to the same line number. These blocks are likely to be constantly swapped into and out of the cache, causing a low cache hit ratio.

Another cache organization is the associative cache organization. A fully associative cache simply has a pool of cache lines, and a memory operand can be stored in any cache line. When a memory operand is stored in an associative cache, the address of the memory operand (excluding any bits representing the bytes stored within the cache line) is stored in a tag field associated with the cache line. Whenever a memory operation occurs, the tag fields associated with each cache line are searched to see if the memory operand is stored in the cache. Fully associative mapping has a hit ratio that is better than that of a direct-mapped cache because any line in the fully associative cache can hold any address that needs to be cached. However, in a fully associative cache, all tag fields of all cache lines must be searched, and as the number of cache lines is increased, the time required to search all tag fields (and/or the complexity of the searching logic) also increases, thus resulting in a performance penalty.

The set-associative cache organization is a hybrid of the direct-mapped and associative memory organizations. In set-associative mapping, the cache is divided into a number of smaller direct-mapped areas called "sets" or "ways," with each set or way holding a number of lines. The cache is then described in the number of lines each set contains. For example, if a cache can hold X lines that are divided into K areas such that each area holds X/K lines, the cache is referred to as a K-way set-associative cache with X/K sets.

The set-associative cache organization allows a cache to have many cache lines, while limiting the number of tag fields that must be searched. In addition, memory operands need not contend for the same cache line, as in a direct-mapped cache. The number of sets in a set-associative cache is set as a power of two. For example, a 4-way set-associative cache memory contains four sets, which is equal to $2^2$. Therefore, each cache memory set is addressed by two bits. The use of set-associative cache organization is thus considered to provide a good balance between hit ratio and search speed. However, as the associativity of the set-associative cache increases, such as for a 16-way set-associative cache, efficiency degrades and a significant hardware penalty typically is incurred.

Accordingly, system 100 is used to quickly and efficiently fetch data even in instances where a set-associative cache has a high associativity. For example, when an address from shared cache memory 112 is requested by one of processing cores 104-110, each of cache memory banks Bank0 118, Bank1 120, Bank2 122, and Bank3 124 will determine in parallel a candidate address for eviction. The candidate address is selected using an address determination algorithm performed by each of the banks. For illustrative purposes, FIG. 1 shows Bank0 having logic for performing an address determination algorithm, however, each of Bank2, Bank3, and Bank4 include similar logic for performing an address determination algorithm to determine a candidate address for eviction.

When each of the cache memory banks have determined a candidate address for eviction, GCC 114 performs an address selection algorithm, different from the address determination algorithm, on the candidate addresses returned by each of the banks. The address selection algorithm performed by GCC 114 selects one of the candidate addresses, and uses the selected candidate address to fulfill the request from the requesting processing core. The following discussion provides a more detailed discussion of these processes.

Figure 2:
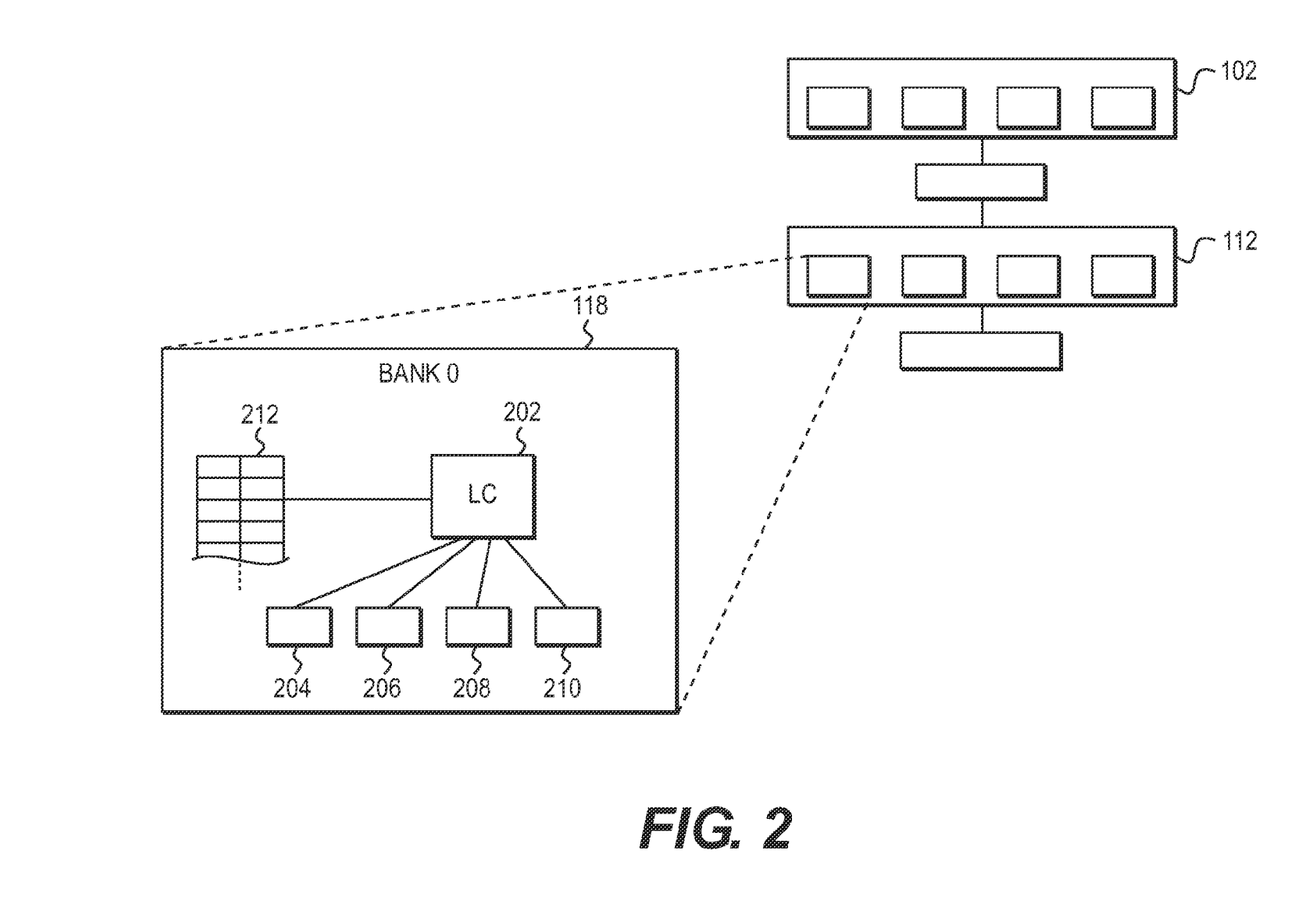
FIG. 2 is a block diagram illustrating a cache memory bank, in accordance with an embodiment.

FIG. 2 illustrates a cache memory bank (Bank0) 118 of cache memory 112 in accordance with an embodiment of the disclosure. In the embodiment seen in FIG. 2, bank 118 is a 4-way set-associative cache memory bank, having sets 204, 206, 208, and 210. However, it is noted that bank 118 suitably has any number of sets, and in an embodiment, for example, is an 8-way set-associative cache memory bank (i.e., $2^3$-way). As noted above, any other suitable number $2^N$-ways may be used. A local controller (LC) 202 within bank 118 is associated with sets 204-210. In an embodiment, within bank 118 local controller 202 performs an algorithm for determining, from among sets 204-210 in bank 118, a suitable candidate address for eviction. Furthermore, in the embodiment seen in FIG. 2, bank 118 also includes a bank table 212 that maps addresses to attributes and which is used by the address determination algorithm for determining the candidate address for eviction based on a resulting cache miss. By use of bank table 212, local controller 202 performs an address determination algorithm to select the appropriate set, and therefore candidate address, based on attributes of the request received by one of processing cores 104-110.

One example of a suitable address determination algorithm usable by local controller 202 is the Least Recently Used (LRU) algorithm. As the name implies, this algorithm discards the cache set that was used least recently. This algorithm tends to be very effective because the algorithm observes both cache hits and cache misses to establish correspondence between the candidate address of the set selected for replacement and the probability that the set will be quickly needed again following a subsequent request from one of the processors.

Figure 3:
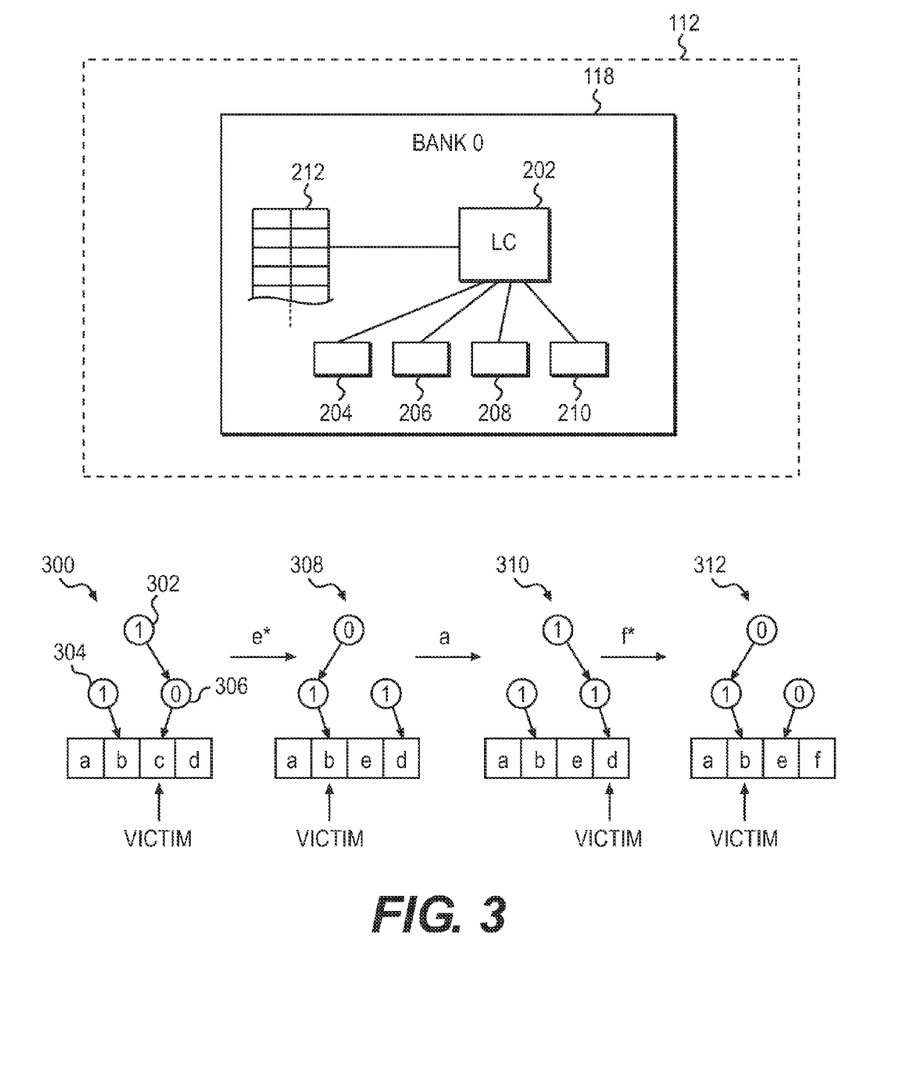
FIG. 3 is a block diagram illustrating processing by a local controller (LC) of a cache memory bank, in accordance with an embodiment.

In another embodiment, a variant of the LRU algorithm, called Pseudo-LRU (PLRU), is also suitable for use in determining a candidate address at memory banks 118-124. FIG. 3 shows bank 118 in a portion of cache memory 112 having a local controller 202, in accordance with an embodiment of the disclosure. The local controller 202 seen in FIG. 3 uses a PLRU algorithm to determine a candidate address from among sets 204-210. Specifically, the PLRU algorithm determines an appropriate "victim" set from among sets 204-210. The use of the PLRU algorithm as an address determination algorithm is illustrated by tree 300, where leaves a, b, c, and d correspond to sets 204-210. Trees 308, 310, and 312 illustrate the decision process occurring in local controller 202 upon successive performances of a PLRU algorithm for determining an appropriate victim set from among sets 204-210.

The PLRU algorithm is a variant of LRU and is a tree-based approximation of the LRU algorithm. The PLRU constructs a binary search tree 300 having nodes 302, 304, and 306, as well as leaves a, b, c, and d. The leaves of the hierarchy represent individual cache sets, such as sets 204-210. The nodes 302, 304 and 306 represent a bit of a vector used for designating a particular cache set, a "0" bit indicating the left subtree and a "1" bit indicating the right subtree. After every access that hits a specific set (represented by leaves a, b, c, and d), the two bits on the path from the root to the accessed set are flipped to point away from the set. Other tree bits are left untouched. As explained in detail below, binary search trees 308, 310, and 312 are illustrative examples of three consecutive uses of the PLRU algorithm on tree 300, based on incoming requests for elements e (a cache miss), a (a cache hit), and f (a cache miss).

For example, upon receiving a request to access element e from the cache, the PLRU algorithm determines whether the access is a cache hit, such as when the required memory operand is already in the cache memory, or a cache miss, such as when the memory operand is not in the cache and must be loaded from a memory system. As shown in tree 300, element e is not present (signified by e*), and therefore the first access in the sequence, to e, is a cache miss. As node 302 has a "1" bit, the algorithm proceeds to node 306, which has a "0" bit, directing the algorithm to the appropriate replacement candidate or victim. In the embodiment seen, the PLRU selects c as the victim, which is pointed to by the tree bits. Accordingly, c is replaced by e, and the tree bits on the path from the root to e (i.e., bits 302 and 306) of the tree are flipped to protect e from eviction, resulting in tree 308 now having elements a, b, e, and d. Thus, when local controller 202 performs a PLRU algorithm on sets 204-210, the logic performed in selecting the appropriate candidate victim set will correspond to the use of the PLRU algorithm on tree 300, and set 208, corresponding to c in tree 300, will be selected as the appropriate victim set.

The second access in the sequence, to a, illustrated in tree 308, is a cache hit, and therefore no element needs to be replaced. The left tree bit already points away from a, so only the root tree bit is flipped, resulting in tree 310. Another access to a would not change any of the tree bits at all. Finally, the access to f is another miss (signified by f*), and the algorithm traverses the nodes to the replacement candidate (victim) d, replacing it with f, as shown in tree 312. By updating nodes of the cache memory hierarchy in the manner described, local controller 202 determines an appropriate candidate victim set.

Several additional address determination algorithms are suitable for use by local controller 202 of bank 118 for selecting a candidate victim address when a cache miss occurs. For example, in an embodiment local controller 202 is configured to use a First-In First-Out (FIFO) algorithm. This algorithm treats the set as a circular queue, where the oldest set will be selected to be replaced. In another embodiment local controller 202 is configured to use other address determination algorithms such as a Semi-FIFO algorithm and a Most Recently Used (MRU) algorithm.

Figure 4:
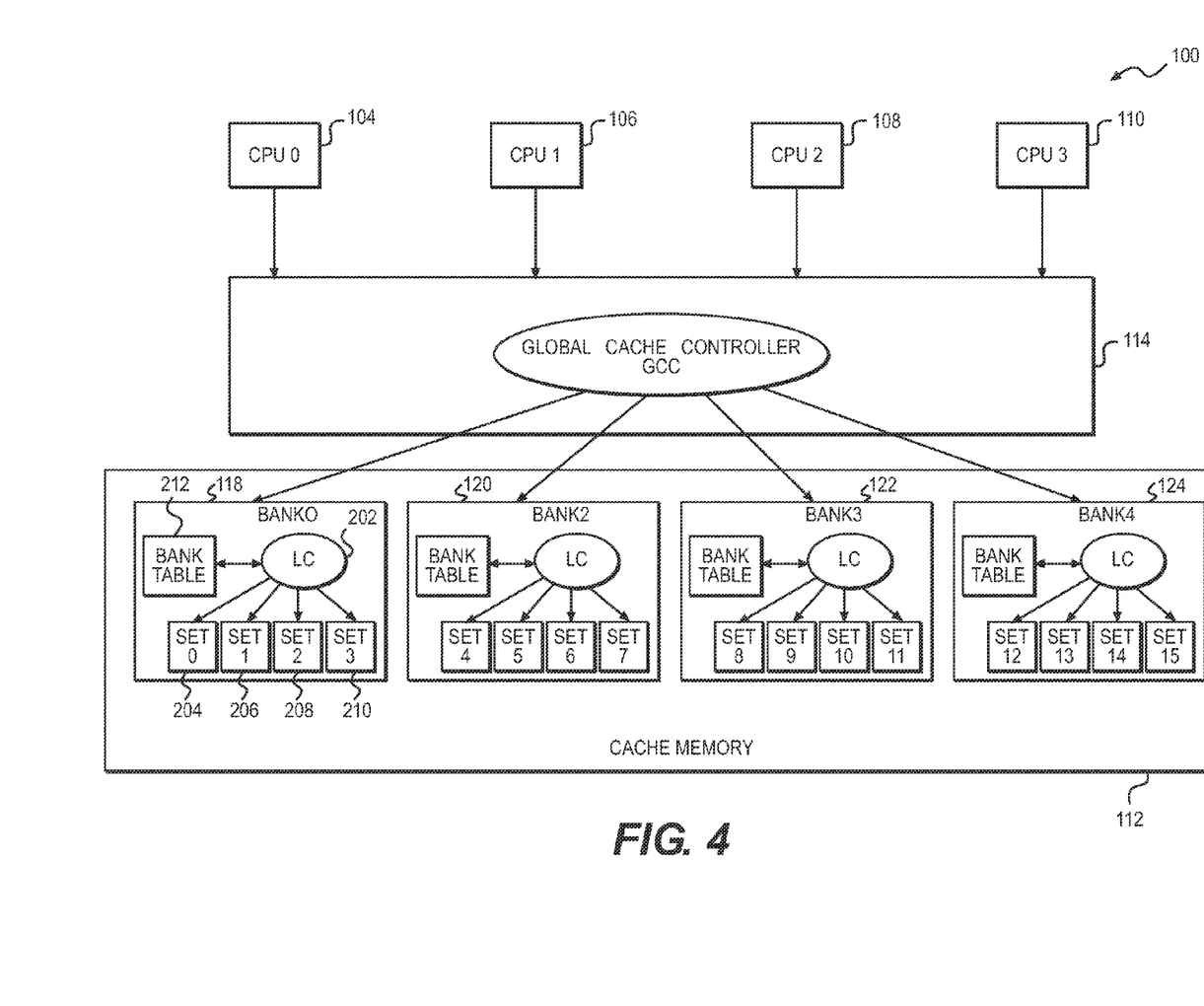
FIG. 4 is a block diagram illustrating a system for determining a next available address for writing data to a cache memory, in accordance with an embodiment.

FIG. 4 is a detailed block diagram of system on chip 100, illustrating the division of cache memory 112 into groups of banks 118-124, where processing cores 104-110 are connected to global cache controller (GCC) 114, in accordance with an embodiment of the disclosure. In the example, GCC 114 is used to control banks 118-124 of the cache memory 112. As seen in FIGS. 2 and 3, banks 118-124 each contain, for example, a local controller (LC), bank table, and sets, such as local controller 202, sets 204-210, and bank table 212. Furthermore, in the embodiment, the local controllers for each bank perform an address determination algorithm to determine a candidate set from among the sets in each bank. Once the candidate set is determined, an address within the candidate set is used for eviction and replacement based on the attributes in the request and by utilizing the bank table that is local to each memory bank.

Figure 5:
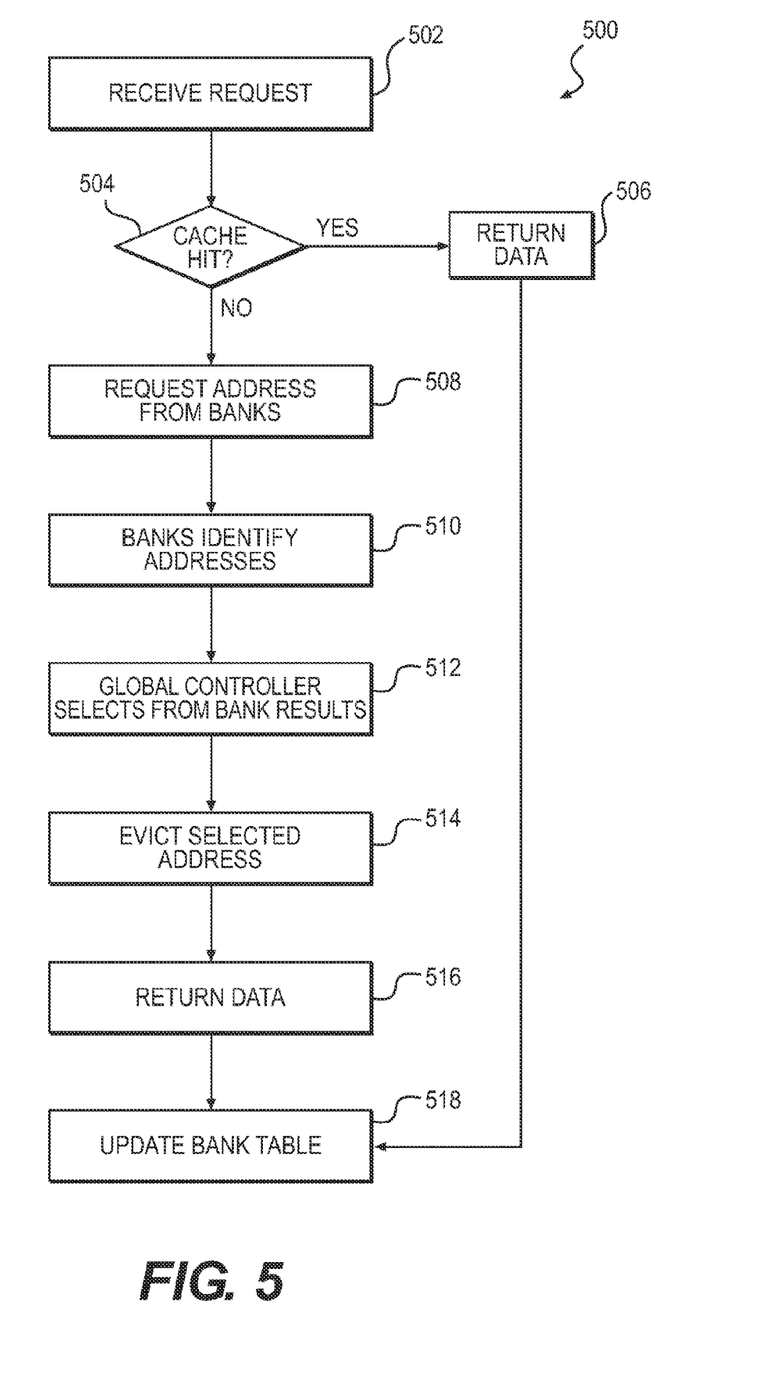
FIG. 5 is a flow diagram of an illustrative method for determining a next available address for writing data to a cache memory, in accordance with an embodiment.

FIG. 5 is a flow diagram of a method 500 for selecting a candidate address for eviction, in accordance with an embodiment of the disclosure. FIG. 5 is described with reference to FIG. 4. Method 500 begins at step 502, where one of processing cores 104-110 requests a line from main memory 116, for example to be used in a subsequent memory operation. Global cache controller 114 receives this request and, in step 504, determines whether a cache hit occurred, that is, whether the requested line is already present in cache memory 112. If a cache hit occurs, method 500 proceeds to step 506, where the requested data is returned to the requesting processing core. Step 506 then proceeds to step 518, where the local table corresponding to the bank containing the requested data updates its bank table with information regarding the recently requested data for use in determining the appropriate address within each set used for eviction and replacement.

If a cache miss occurs and the cache is full, global cache controller 114 must choose a candidate address in the cache for eviction and replacement. Thus, in step 508, global cache controller 114 requests that each of cache memory banks 118-124 determine a candidate address for replacement from among the sets in each memory bank. As set forth in the description of FIG. 3, with reference to bank 118, local controller 202 performs an address determination algorithm and selects an appropriate set from amongst sets 204-210. Furthermore, in the embodiment, the address determination algorithm performed by local controller 202 is additionally performed simultaneously by each of the local controllers for banks 120, 122, and 124 respectively.

In step 510, each of banks 118-124 performs an address determination algorithm simultaneously and independently of the other cache memory banks. The local controllers of each memory bank perform an address determination based on the attributes of the request by utilizing the bank table that is local to each memory bank. As set forth above, the address determination algorithm may be suitably one of a number of different algorithms which is dependent on the address itself, such as LRU, PLRU, FIFO, Semi-FIFO, or MRU address determination algorithms. In an embodiment, the bank table maps addresses to attributes, which are used as arguments for the address determination algorithm in determining the appropriate address within each set used for eviction and replacement. For example, if an LRU algorithm is used by the local controller, the bank table suitably holds for each index a permutation of the memory bank sets for defining the order of access of the sets. As a result of performing the address determination algorithm, each cache memory bank provides, to the global cache controller, a candidate address or set that is suitable for eviction and replacement, based on the address determination algorithm and the attributes from the bank table. Accordingly, in the embodiment of FIG. 5, global cache controller 114 receives N candidate addresses, where N is equal to the number of cache memory banks used in cache memory 112.

Next, in step 512, global cache controller 114 selects an address for eviction and replacement from among the candidate addresses returned to global cache controller 114 from cache memory banks 118-124. In an embodiment, global cache controller 114 performs the selection between the candidate addresses by performing a function independent of attributes of any requests received from processing cores 104-110. That is, global cache controller 114 performs a nonattribute-based selection from among the candidate addresses. Suitable functions include, for example, a random function or a round-robin function, which is different function from the address determination algorithm. Alternatively, global cache controller 114 is implemented as a linear feedback shift register, and the selection from among the candidate addresses is performed according to the shift register.

Accordingly, in an embodiment, global cache controller 114 selects an address for eviction and replacement utilizing a methodology that is decoupled from the logic used by each of the local controllers to select the candidate addresses from the cache memory banks. This allocation of separate decision logic permits each cache memory bank to handle the tracking of set states on a smaller scale, and eliminates the need to handle the tracking of all set states in the cache by a single controller, which potentially facilitates faster and more efficient fetching of data from larger cache memories. Furthermore, the use of the global cache controller minimizes the amount of communication required between the cache memory banks, as the initial candidate address determinations are controlled independently by each of the banks, and the global cache controller need only receive candidate addresses from the banks. Once global cache controller 114 selects an address for eviction, the address selected by global cache controller 114 is swapped-out to main memory 116 in step 514 in order to free space for the new requested data, and the requested data is swapped-in from main memory 116 to fulfill the received request from one of processing cores 104-110 in step 516. Step 516 then proceeds to step 518, where the local table corresponding to the bank containing the requested data updates its bank table with information regarding the recently requested data for use in determining the appropriate address within each set used for eviction and replacement.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

While illustrative embodiments have been described herein, the scope includes any and all embodiments having equivalent elements, modifications, omissions, combinations (e.g., of aspects across various embodiments), adaptations, and/or alterations based on the present disclosure. The limitations in the claims are to be interpreted broadly based on the language employed in the claims and not limited to examples described in the present specification or during the prosecution of the application, which examples are to be construed as nonexclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A method for determining a next available address for writing data to a cache memory, the method comprising:
   receiving a request for a candidate address in the cache memory, wherein the cache memory is divided into a plurality of cache memory banks;
   determining a candidate address in each of the plurality of cache memory banks using an address determination algorithm such that a plurality of candidate addresses are determined corresponding to the plurality of cache memory banks;
   selecting a candidate address from among the determined plurality of candidate addresses using an address selection function that is different from the address determination algorithm; and
   returning the selected candidate address in response to the request.

2. The method of claim 1, wherein the address selection function is performed independent of attributes of the request.

3. The method of claim 1, wherein the address selection function is performed according to a random function or a round-robin function.

4. The method of claim 1, wherein selecting a candidate address from among the determined plurality of candidate addresses comprises:
   performing the address selection function using a linear feedback shift register.

5. The method of claim 1, wherein determining a candidate address in each of the plurality of cache memory banks comprises:

performing the address determination algorithm by a controller local to each of the plurality of cache memory banks.

6. The method of claim 5, wherein determining a candidate address in each of the plurality of cache memory banks comprises:
performing, by the controller local to each of the plurality of cache memory banks, the address determination algorithm simultaneously and independently of other controllers local to other cache memory banks.

7. The method of claim 5, wherein determining a candidate address in each of the plurality of cache memory banks comprises:
performing, by the controller local to each of the cache memory banks, the address determination algorithm selected from one of a Least Recently Used (LRU) algorithm, a Pseudo-LRU algorithm, a First-In, First-Out (FIFO) algorithm, a Semi-FIFO algorithm, or a Most Recently Used (MRU) algorithm.

8. The method of claim 1, further comprising:
accessing, for each cache memory bank, a bank table local to the cache memory bank for determining attributes of the addresses in the cache memory bank,
wherein selecting a candidate address from among the determined plurality of candidate addresses further comprises selecting the candidate address further based on the accessed attributes.

9. A system on a chip, comprising:
one or more processors;
a shared memory that is shared by the one or more processors, the shared memory comprising a plurality of memory banks, each memory bank respectively having a local control unit configured to perform an address determination algorithm on a corresponding memory bank such that, for each of the plurality of memory banks, a corresponding candidate address is determined, wherein the local control units operate in parallel to determine a set of candidate addresses corresponding to the plurality of memory banks in response to an address request from the one or more processors; and
a global controller operably connected to the shared memory, the global controller being configured to
select a candidate address from among the determined set of candidate addresses, and
return the selected address in response to the address request.

10. The system of claim 9, wherein the address determination algorithm is selected from one of a Least Recently Used (LRU) algorithm, a Pseudo-LRU algorithm, a First-In, First-Out (FIFO) algorithm, a Semi-FIFO algorithm, or a Most Recently Used (MRU) algorithm.

11. The system of claim 9, wherein the global controller is configured to select the selected candidate address using an address selection function different from the address determination algorithm.

12. The system of claim 9, wherein the global controller is configured to select the selected candidate address using a linear feedback shift register.

13. The system of claim 9, wherein each memory bank further comprises a bank table mapping addresses of the memory bank to attributes used by the address determination algorithm for determining a candidate address for the memory bank.

14. A global controller for controlling a cache memory divided into a plurality of cache memory banks, the global controller executing logic to perform a method comprising:
receiving a request for data from one or more processors;
requesting a candidate address from each of the cache memory banks;
receiving a candidate address from each of the cache memory banks such that a plurality of candidate addresses are received corresponding to the plurality of cache memory banks, the candidate addresses being determined using an address determination algorithm;
selecting a candidate address from among the received plurality of candidate addresses using an address selection function different from the address determination algorithm; and
returning the selected candidate address in response to the request.

15. The global controller of claim 14, wherein the address selection function is performed independent of attributes of the request.

16. The global controller of claim 14, wherein the address selection function is performed according to one of a random function and a round-robin function.

17. The global controller of claim 14, wherein the address selection function is performed using a linear feedback shift register.

18. The global controller of claim 14, further executing logic to receive the candidate addresses from each of the cache memory banks, wherein the candidate addresses are selected using an address determination algorithm by a controller local to each of the cache memory banks.

19. The global controller of claim 18, further executing logic to receive the candidate addresses from each of the cache memory banks, wherein the address determination algorithm is performed simultaneously and independently by the controller local to each of the cache memory banks.

20. The global controller of claim 18, further executing logic to receive the candidate addresses from each of the cache memory banks, wherein the controller local to each of the cache memory banks uses an address determination algorithm selected from one of a Least Recently Used (LRU) algorithm, a Pseudo-LRU algorithm, a First-In, First-Out (FIFO) algorithm, a Semi-FIFO algorithm, or a Most Recently Used (MRU) algorithm.

* * * * *